United States Patent [19]

Shimahara et al.

[11] 3,922,639
[45] Nov. 25, 1975

[54] MULTIPLE INPUT SIGNAL DETECTING DEVICE

[75] Inventors: Yoichi Shimahara; Takashi Shimada, both of Takatsuki; Shigeki Kitamura, Hirakata; Hiroshi Miyanishi; Hiroshi Senda, both of Neyagawa, all of Japan

[73] Assignees: Toyo Rubber Industry Co., Ltd.; Matsushita Electric Industrial Co., Ltd., both of Osaka, Japan

[22] Filed: Aug. 27, 1974

[21] Appl. No.: 501,104

[30]  Foreign Application Priority Data
  Aug. 28, 1973 Japan ............................ 48-96886
  Aug. 28, 1973 Japan ............................ 48-96887
  Aug. 28, 1973 Japan ............................ 48-96888
  Aug. 28, 1973 Japan ........................... 48-101514
  Aug. 28, 1973 Japan ........................... 48-101515

[52] U.S. Cl. ............. 340/52 F; 340/58; 340/253 N
[51] Int. Cl.² ............................................ G08B 19/00
[58] Field of Search ............ 340/50, 58, 52 F, 52 R, 340/248 E, 251, 253 H, 253 N, 248 A, 248 R, 27, 80; 315/129, 130; 317/148, 150, 155.5, 157

[56]        References Cited
        UNITED STATES PATENTS
3,061,828  10/1962  Hauck ............................. 340/251
3,250,950  5/1966  Reiche ............................ 340/52 F
3,555,535  1/1971  Henriques ..................... 340/251 X
3,710,364  1/1973  Kuhn ............................. 340/251 X
3,745,548  7/1973  Skelton et al. ............. 340/248 E X

*Primary Examiner*—Alvin H. Waring
*Attorney, Agent, or Firm*—Sughrue, Rothwell, Mion, Zinn & Macpeak

[57]        ABSTRACT

A device for detecting multiple input signals, which comprises a signal detecting circuit including a plurality of signal carrier lines for carrying a plurality of AC input signals changeable in electric characteristics such as levels, phases or frequencies upon occurrence of abnormality, and a multi-input transformer having a plurality of primary windings connected to resepective signal carrier lines and at least one secondary widning including an output secondary winding which, all of the windings being wound around an iron core having a common magnetic circuit, and an output circuit for treating an output from the output secondary winding of the multi-input transformer. The primary windings in the signal detecting circuit are wound to magnetically cancel the magnetic flux of the AC input signals when all of the signals are normal, and are coupled between the signal carrier lines and the output circuits to produce an output at the output secondary winding upon upsetting of the balance required for magnetic cancellation when at least one of the AC input signals becomes abnormal.

9 Claims, 21 Drawing Figures

SIGNAL GENERATORS 3,922,639

MULTIPLE INPUT SIGNAL DETECTING DEVICE

BACKGROUND OF THE INVENTION

1. Field of the Invention

This invention relates to a device for detecting multiple input signals for effecting centralized supervision or monitoring of possible abnormality in a plurality of elements to be detected through an electrical signal transmitting system, and more particularly to a signal detecting device for accurately and positively detecting abnormality to produce an output when at least one of the input signals changes its characteristics. This invention is further directed to a multiple input signal detecting device which is capable of detecting possible abnormality in a plurality of AC input signals by a single circuit capable of being formed simply and in small size, and which is effectively applicable for centralized supervision.

2. Description of the Prior Art

It is well known that recent remarkable progress in a signal transmission technique and easy availability of electronic materials of high quality, such as a semiconductor etc., has paved the way for high-degree information management with elimination and reduction of labor through centralized supervision of various data. The requisites for the centralized supervision of this kind are precise and accurate detecting ability in function and simpleness, small-size and easiness to handle and to maintain in construction.

In a conventional centralized supervisory device is usually and widely employed a detecting device which is adapted to collectively receive a plurality of input signals (signals showing normal condition) and to detect an abnormality when at least one of the input signals is abnormal. More particularly, the conventional device of this kind usually has a circuit composed of level amplifiers ($11_{-1}$)($11_{-2}$) . . . provided respectively for the input signals ($1'_{-1}$), ($1'_{-2}$) . . . , an OR circuit 12 which is connected to the output terminals of said amplifiers ($11_{-1}$), ($11_{-2}$) . . . for making a logical sum and alarm means 5 connected to said OR circuit as depicted in FIG. 1. The input signals ($1'_{-1}$), ($1'_{-2}$) . . . are amplified by said level amplifiers ($11_{-1}$), ($11_{-2}$) . . . and then if at least one of the signals changes its level due to abnormality, there appears an output at the OR circuit 12 detecting the variation in the level and operating the alarm means 5 to indicate the abnormality.

The conventional device as mentioned above, however, has disadvantages in that circuit formation is rather complicated because it is required to provide as many of the amplifiers ($11_{-1}$), ($11_{-2}$) . . . as the number of the input signals ($1'_{-1}$), ($1'_{-2}$) . . . and that the OR circuit 12 is also made complicated because it requires additional circuitry for every increase number of the amplifiers and requires modification according to the increase or decrease in the number of the AC input signals ($1'_{-1}$), ($1'_{-2}$) . . . . Thus, the device has difficulty for wide and general application and does not well satisfy the requisites for a supervisory device as mentioned above.

SUMMARY OF THE INVENTION

It is an object of the present invention to provide a device for detecting multiple input signals which is capable of overcoming every shortcoming of the conventional device as mentioned above and accurately detecting possible abnormality in a plurality of elements to be detected by a simplified mechanism and circuit, and suitable for centralized supervision.

It is another object of the present invention to provide a device for detecting multiple input signals which is capable of detecting possible changes in the digital value of multiple input signals by a single output device even when one or more signals are changed in characteristics, thereby to detect not only the occurrence of an abnormality but also the kind of abnormality, effectively serving for scientific management.

It is a further object of the present invention to provide a device for detecting multiple input signals which is capable of being adapted to an increase or decrease in the number of AC input signals by previously designed means, thereby to make the device suitable for general and wide application.

It is a still further object of the present invention to provide a device for detecting multiple input signals which is capable of adjusting possible unevenness or inequality in characteristics of the signals to equalize said signals, thereby to facilitate mounting of a signal generator and wiring for carrying said signals, making the device suitable for practical use.

It is a still further object of the present invention to provide a device for detecting multiple signals which is capable of accurately detecting possible abnormality in characteristics of signals by a single circuit irrespective of the number of abnormal signals, thereby to effectively detect possible unexpected abnormality.

It is a still further object of the present invention to provide a device for detecting multiple input signals which is capable of effective centralized instrument supervision of abnormality in tires mounted on respective wheels of a vehicle such as a motor car by a driver or other occupants, thereby to increase safety.

It is a still further object of the present invention to provide a device for detecting multiple input signals wherein transmission of signals, detected with respect to an air pressure of tires between a car body and a rotary tire system of a vehicle which are in a relative movement relationship, is effected by an electromagnetic induction propagation system of high ratio of signal to noise and which is capable of centrally supervising a plurality of the signals quantitatively as well as qualitatively by the detecting device of a single mechanism and suitable for detection of air pressure of tires.

In one aspect of the present invention, there is provided a device for detecting multiple input signals, which comprises a signal detecting circuit including a plurality of signal carrier lines for carrying a plurality of AC input signals in electric characteristics such as levels, phases or frequencies upon occurrence of abnormality and a multi-input transformer having a plurality of primary windings connected to respective signal carrier lines and at least one secondary winding including an output secondary winding, all the winding being wound around an iron core having a common magnetic circuit; and an output circuit for treating an output from said output secondary winding of the multi-input transformer; said primary windings in the signal detecting circuit are wound to magnetically cancel the magnetic flux of said AC input signals when all of the signals are kept normal and are connected between said signal carrier lines and the output circuits to produce an output at said output secondary winding upon upsetting of the balance for magnetic cancellation when at least one of the AC input signals becomes abnormal.

In another aspect of the present invention, there is provided a device as mentioned above, wherein said AC input signals are of an even number, half of either of said signal carrier lines or said primary windings are inverted in polarity, and said magnetic cancellation of the magnetic flux caused by said AC input signals is effected at the primary windings of the transformer.

In a further aspect of the present invention, there is provided a device according to claim 1, wherein said signal carrier lines are connected to said signal detecting circuit to apply AC input signals carried by the respective lines to the respective primary windings with polarity to add magnetic flux at the primary windings of said multi-input transformer, and to either the primary windings or the secondary winding is connected an AC power source for cancelling the total magnetic flux of the AC input signals.

In a still further aspect of the present invention, there is provided a device as mentioned above wherein said signal carrier lines, said signal detecting circuits and said output circuits are provided on a body of a vehicle and said signal carrier lines are connected to output terminals of transmitter units each composed of a sensor for detecting abnormality in a tire attached to a respective wheel of the vehicle, and an AC signal generator is provided on the body and adapted to transmit AC signals upon direct receipt thereof through an electric conductor or indirect receipt thereof by electromagnetic induction from the sensor.

In a still further aspect of the present invention, there is provided a device as mentioned above wherein said signal carrier line is connected to each of the output terminals of an AC signal transmitting unit provided in each of the rotary tire systems and comprising an electric winding connected at both of the ends to a pressure sensor, which is attached to each of said rotary tire systems in a coaxial relation and which is adapted to be operative in response to an air pressure of tire, a transmitting coil and a receiving coil are both attached to the body of the vehicle in proximity to said electric winding, and a transmitter circuit and a receiver circuit are both attached to the body of the vehicle in association with said transmitting coil and said receiving coil, respectively, whereby a signal from said transmitting coil is transmitted as a change of level to said receiving coil through said electric winding. An input wave-form from said transmitter circuit is superposed onto a noise signal of said receiving coil generated due to a mutual induction other than that caused by a normal signal to be transmitted, and at least one adjustment of a phase adjustment for adjusting phases of the input wave-form and the noise signal to inverse phases and a gain adjustment for making the value of the superposed input and the value of the noise signal coincident with each other are effected, thereby to compensate the mutual induction other than that caused by the normal signal.

These and other objects and novel features of this invention will become more apparent from the following detailed description with respect to preferred embodiments of the invention when read in conjunction with the accompanying drawings. It should be understood, however, that the drawings as shown herein are not meant to restrict this invention in any way and that many changes, variations and modifications of the construction and arrangement of the invention may further be derived without departing from the spirit and scope of the invention as set forth hereinto in the appended claims

BRIEF DESCRIPTION OF THE DRAWINGS

FIGS. 5 through 7 are block wiring diagrams of the devices corresponding to FIGS. 2 through 4, respectively: FIG. 8 is a similar block wiring diagram of another form of the device according to present invention: and FIG. 9 is an explanatory view of sensors employable in FIGS. 5 through 8;

FIG. 14 is a block wiring diagram showing a basic principle: FIG. 15 is a developed view of FIG. 14: FIGS. 14 (a)(b) are vector diagrams illustratively showing the operation principle of the device of FIG. 14: FIG. 17 is a developed view of modification of FIG. 15: FIG. 18 is a diagram showing relationship between a signal waveform and a noise waveform of FIG. 14: FIG. 19 is a cross sectional view of wheel section showing a mode of mounting an electric winding in relation with FIG. 14: and FIG. 20 is a diagram showing relationship between a signal waveform and a noise waveform of a conventional AC input signal generating means.

DESCRIPTION OF THE PREFERRED EMBODIMENT

Figure 1:
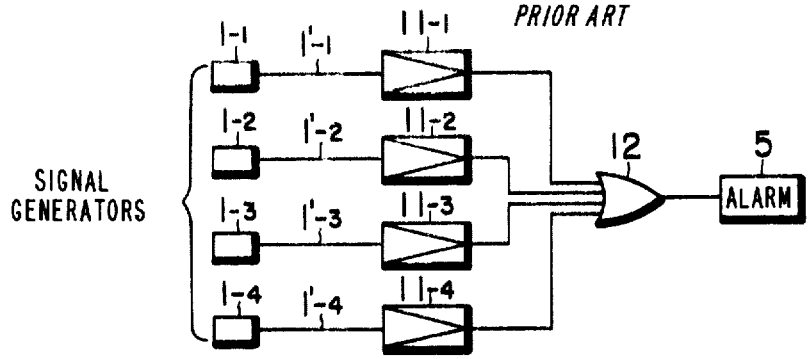
FIG. 1 is a block wiring diagram of a conventional multi-input signal detecting device employed for centralized supervision.
Figure 2:
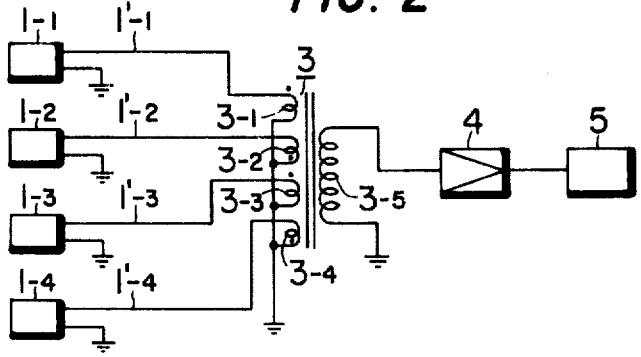
FIGS. 2 through 4 are block wiring diagrams showing basic circuits for different forms of the device according to the present invention.

In FIG. 2, an even number of AC input signal generators $1_{-1}$, $1_{-2}$ . . . are adapted to produce AC signals by converting changes or variations in temperature, pressure, properties of matter or movement of objects to be supervised or monitored to AC electric displacements. The signals $1'_{-1}$, $1'_{-2}$ . . . from said signal generators $1_{-1}$, $1_{-2}$ . . . are applied, with their polarities the same as one another, to respective primary windings $3_{-1}$, $3_{-2}$ . . . of a multi-input transformer 3 through respective signal carrier lines.

Said multi-input transformer 3 has an even number of primary windings $3_{-1}$, $3_{-2}$ . . . at least as many as the AC input signals $1'_{-1}$, $1'_{-2}$ . . . for example four and one secondary winding $3_{-s}$, with all the windings being wound around an iron core having a common magnetic circuit. Said primary windings are divided into pairs. In each pair of windings, one is arranged to be of substractive polarity and the other of additive polarity. Since the AC input signals $1'_{-1} - 1'_{-4}$ are applied with the same polarities to said respective primary windings as mentioned above, said AC input signals $1'_{-1} - 1'_{-4}$ are magnetically cancelled at said multi-input transformer 3, producing no outputs at the secondary winding $3_{-s}$.

In the device as set forth above, the connection made between the AC input signals $1'_{-1} - 1'_{-4}$ and the multi-input transformer 3 is not limited to the connection as mentioned above. It may alternatively be so constructed that the primary windings $3_{-1} - 3_{-4}$ are arranged to be of the same polarity and that the AC input signals $1'_{-1} - 1'_{-4}$ are applied to the primary windings $3_{-1} - 3_{-4}$ while half of them being inverted in polarity. Thus, many changes, variations and modifications may be made without departing from the spirit and scope of the invention as set forth in the claims.

In the thus formed circuit construction, it is apparent that no outout will appear at the secondary winding $3_{-5}$ for the normal condition, and it is also obvious that an amplifier 4 and alarm means 5 connected to said secondary winding $3_{-5}$ remain inoperative as long as the AC input signals $1'_{-1} - 1'_{-4}$ have not changed their characteristics.

If any one of the input signals or an odd number of signals change their signal levels, for example become zero, the balance required for the magnetic cancellation at the multi-input transformer 3 is destroyed, and an output is produced at the secondary winding $3_{-5}$.

Thus, possible changes in a plurality of input signals $1'_{-1} - 1'_{-4}$ are detected by a single circuit formed of the multi-input transformer 3, the amplifier 4 and the alarm means 5, which is thus capable of being used as a centralized supervisory device for multiple inputs. In case the level of the output of the secondary winding $3_{-5}$ is sufficiently high, a relay of high performability may be operated directly without using an amplifier as shown in FIG. 2, while in case the level of the output is not sufficiently high, conventional voltage and power amplifiers are connected as shown in FIG. 2 to obtain an output of a predetermined level.

Figure 3:
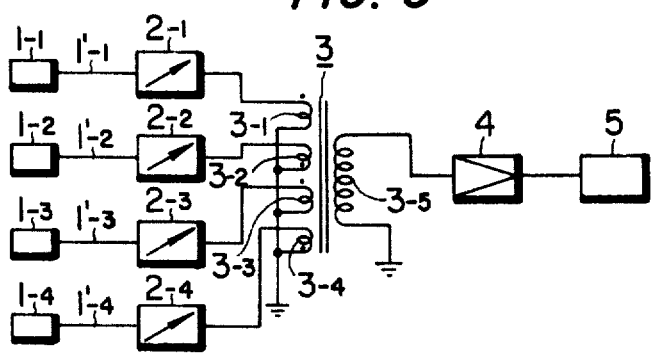

FIG. 3 shows another embodiment of the present invention which is intended to solve a possible problem involved in the embodiment as shown in FIG. 2. Illustratively stated, the circuit of FIG. 2 cannot completely effect magnetic cancellation at the multi-input transformer 3 if some or all of the AC input signals $1'_{-1} - 1'_{-4}$ are different in levels and phases, and therefore it is proposed in the present embodiment as shown in FIG. 3 that the AC input signals $1'_{-1} - 1'_{-4}$ from the AC input signal generators $1_{-1} - 1_{-4}$ be adjusted to have the same characteristics by a signal adjusting circuit 2 which is adapted to adjust said AC input signals with respect to signal level and/or phase, and subsequently applied to the primary windings $3_{-1} - 3_{-4}$ of the multi-input transformer 3.

With this specified formation of the circuit, possible unevenness or inequality in characteristics of the signals caused by differences in impedances of conductors of the signal generators $1_{-1} - 1_{-4}$, such as various transducers or sensors, or by differences in mounting means thereof, can be easily and well cancelled before the signals have been applied to the multi-input transformer 3.

Figure 4:
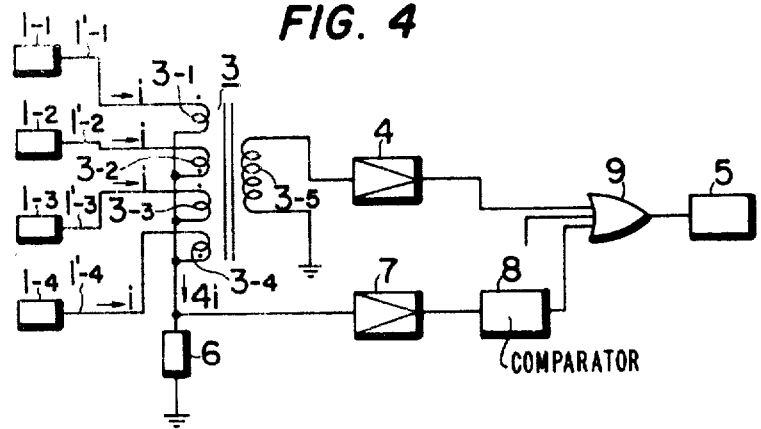

FIG. 4 shows a further embodiment of the present invention. In the foregoing embodiments of FIGS. 2 and 3 wherein the AC input signals $1'1_1 - 1'_{-4}$ are cancelled at the primary windings $3_{-1} - 3_{-4}$ of the multi-input transformer 3, when an even number of AC input signals which are in the relation magnetically cancelling one another change their characteristics, there appear no output signals at the secondary winding $3_{-5}$ for detecting possible changes in characteristics of the signals. Whereas, the device of the FIG. 4 embodiment is adapted to produce an AC output even with such changes in the characteristics of the signals which are in the specific relationship cancelling one another. Illustratively stated, there is provided a circuit formed of an impedance 6 which is connected to a common line of the primary windings $3_{-1}$ to $3_{-4}$ having a reference potential (ground potential), an amplifier 7 which is adapted to amplify an AC signal appearing across the ends of said impedance 6, a comparator circuit 8 which is adapted to select a signal according to the level of the signals amplified by said amplifier 7, and an OR circuit which is adapted to make a logical sum of the output signal of the amplifier 4 and the output signal of the comparator circuit 8.

In the thus formed circuit, a current $4i$ as large as four times the current $i$ flowing through each of the primary windings $3_{-1} - 3_{-4}$ flows through the impedance 6. For example, if two AC input signals are simultaneously extinguished, the current flowing through the impedance 6 is reduced to $2i$. The difference caused by this reduction of the current is detected through the amplifier 7 and the comparator circuit 8, and the thus detected signal is applied to the OR circuit 9 together with the output signal of the multi-input transformer 3 to accurately detect any change in the AC signals $1'_{-1} - 1'_{-4}$ and produce an output.

In the devices of the foregoing embodiment, the multi-input transformer 3 is provided in a signal detecting circuit, which is formed of the even number of primary windings $3_{-1}, 3_{-2} \ldots$ at least as much as the even number of AC input signals $1'_{-1}, 1'_{-2} \ldots$ and one secondary winding all wound around an iron core having a magnetic circuit common thereto; the AC input signals $1'_{-1}, 1'_{-2} \ldots$ are applied to the primary windings $3_{-1}, 3_{-2} \ldots$, respectively, under the condition where the polarities of half of the AC input signals $1'_{-1}, 1'_{-2} \ldots$ or half of the primary windings $3_{-1}, 3_{-2} \ldots$ are inverted to magnetically cancel the AC input signals and not to produce an output at the secondary winding $3_{-5}$; and the magnetic cancellation at the multi-input transformer 3 is prevented when any of the AC input signals $1'_{-1}, 1'_{-2} \ldots$ are changed or varied in levels, frequency or phase, resulting in the occurrence of an output at the secondary winding $3_{-5}$. Accordingly, it is capable of accurately and positively detecting an abnormality even in one of the signals $1'_{-1}, 1'_{-2}$ by a single circuit having the advantages of being simple small-sized and inexpensive, thus promoting wide use of the centralized supervisory device.

The device of the present invention have further advantages in that abnormality is accurately detected irrespective of the number of the input signals changed or varied in characteristics and that the number of the signals in an abnormal state can be determined by the difference in the output signal levels. Further, the devices of the present invention are capable of being adapted according to a possible increase or decrease in the number of the AC input signals by previously providing any desired number of the primary windings $3_{-1}, 3_{-2} \ldots$ in the multi-input transformer 3 and then connecting lines for the even number of AC input signals to said primary windings $3_{-1}, 3_{-2} \ldots$, respectively, thus providing advantages suitable for wide application of the centrally controlled devices conjointly with its ease of operation.

The device as shown in FIG. 3, wherein the signal adjusting circuit 2 is provided for absorbing possible unevenness or inequality in levels or phases of the input signals to increase response accuracy, has a further advantage in that connection of the AC signal generators $1_{-1}, 1_{-2} \ldots$ and wiring for introducing the input signals is simple and easy, effectively facilitating practical application of the device.

The device as shown in FIG. 4, wherein the impedance 6 is connected to the common line of the primary windings $3_{-1}$, $3_{-2}$ ... having the reference voltage, wherein the AC signal appearing across the ends of said impedance 6 is amplified and then applied to the comparator circuit 8 to be subjected to selection according to the level of the signals, and wherein the thus selected signal and the output of the secondary coil $3_{-5}$ are applied to the OR circuit 9 to make a logical sum, has a still further advantage in that possible changes in the input signals can be accurately and positively detected irrespective of the number of the input signals in a state of abnormality or the kinds of the abnormality, thus promoting utility of the device in its practical application.

FIGS. 5 through 8 show devices having the detecting devices of FIGS. 2 through 4 mounted on a vehicle such as a motor car or an air plane for detecting possible abnormality or troubles in its tires and relate to a device for detecting abnormality which is capable of detecting possible abnormality in, for example, inner pressure of even one of the tires in the form of changes in an AC signal and rapidly informing a driver or other occupants of the abnormality. More particularly, they relate to a device for detecting abnormality in tires and which is capable of accurately detecting the abnormality in an even number of tires without failure by a single circuit, and which is simple, small-sized and light in weight, and suitable for centralized supervisory device, If the pressure of the tires mounted on vehicles such as motor cars or air planes is abnormally increased or abruptly decreased during running thereof, not only various troubles of the tires, such as breakage of the tires, but also serious danger to the driver or the other occupants may be caused. In view of this fact, it is widely known that it is absolutely necessary to keep the tires at an appropriate inner pressure condition according to the speed or the road condition.

It is also important to preliminarily take an appropriate countermeasure against possible serious troubles upon detection of other tire abnormalities, such as overheat, deformation or wear.

Figure 8:
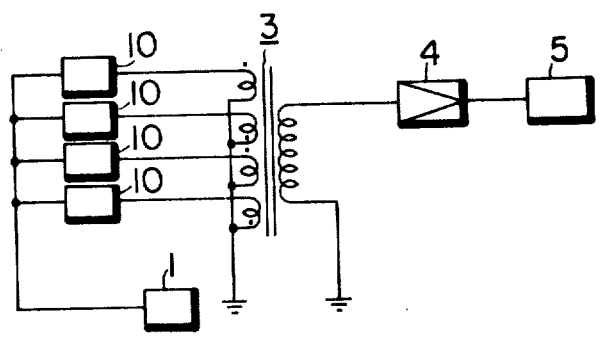
Figure 9:
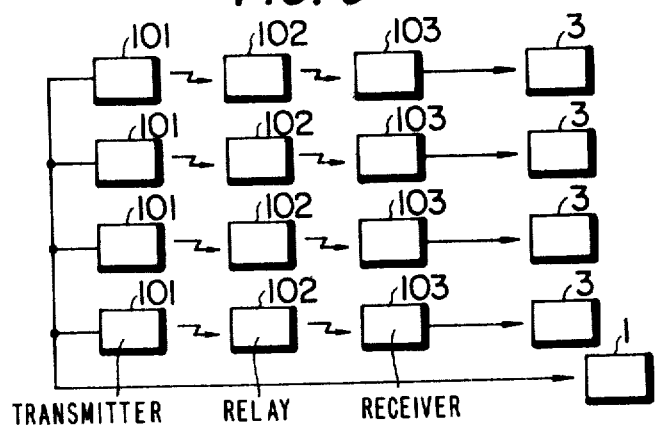

In this connection, it is to be noted that the devices as shown in FIGS. 5 through 8 are mounted on the vehicle to detect possible various abnormalities in the tires and are intended to improve safety measures. In the devices, each of AC signal generators $1_{-1}$, $1_{-2}$ ... as described above is combined with a sensor 10 to form a transmitter unit. Said transmitter unit is mounted on each of the tire systems of the vehicle and adapted to change the characteristics such as level, phase or frequency of AC input signals $1'_{-1}$, $1'_{-2}$ ... produced from a generator upon actuation of the sensor when some abnormality occurs in the tires. The AC signal generator $1_{-1}$, $1_{-2}$ ... may be fixed to a car body and connected to the sensor 10 which is fixed to a rotary member such as a tire rim through a wire system using a sliding mechanism provided in a wheel axle, or alternatively the AC signal generator $1_{-1}$, $1_{-2}$ ... may be connected to the sensor 10 through a radio system by conveying the operation of the sensor 10 to the AC signal generator $1_{-1}$, $1_{-2}$ ... through electromagnetic induction. Thus, the transmitting and receiving of the signals may be effected by various methods. For example, as shown in FIG. 8, the AC signal generator 1 which is employed in common with respective tires may be fixed to the car body to transmit its outputs to the respective primary windings of the multi-input transformer 3 through a wire upon the operation of the sensors 10 which are respectively secured to the tires. Or, as shown in FIG. 9, the sensor secured to each of the tires may be composed of a transmitter head 101, a receiver head 103 and a relay portion 102 which is adapted to vary mutual inductance between said transmitter head 101 and receiver head 103 to a considerable degree according to the conditions of the tires, namely, normal condition or abnormal condition.

The formation of a propagation circuit for the signals from said AC signal generators $1_{-1}$, $1_{-2}$ ... and the operation of said circuit are identical with those of the devices as shown in FIGS. 2 through 4.

Since the thus constructed detecting devices are capable of detecting possible abnormality in tires by a single circuit when at least one of the AC input signals $1'$, $1'$ produced from the AC signal generator 1, 1 upon the actuation of the sensors, which are mounted on respective rotary tire systems, due to the occurrence of an abnormality in the tires, it is possible to make the devices simplified, small-sized and light in weight and manufacture them at a reduced cost. Thus, the devices of the present invention are advantageously applicable for wide use of the centralized supervisory device.

Figure 10:
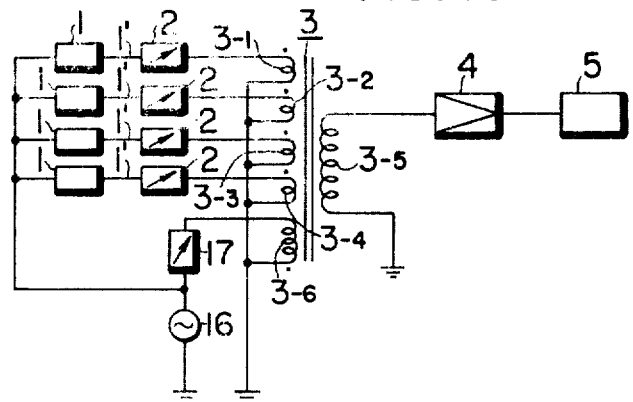
FIGS. 10 and 11 are block wiring diagrams showing basic circuits of further forms of the device according to the present invention.

FIG. 10 shows a still further form of the device according to the present invention. In the device, AC input signals $1'$, $1'$ obtained by converting possible changes in the characteristics of objects to be supervised or monitored, such as variations in temperature or changes in properties of matter to AC electric displacement, are applied with the same polarity to the respective primary windings $3_{-1}$, $3_{-2}$ of a multi-input transformer 3 through signal adjusting circuits 2, 2 which are adapted to adjust the levels and/or phases of the signals.

Said multi-input transformer 3 includes the primary windings $3_{-1}$, $3_{-2}$ ... corresponding to the AC input signals $1'$, $1'$ ... and another primary winding $3_{-6}$ for cancelling. Said primary winding $3_{-6}$ is arranged to be of substractive polarity with reference to the primary windings $3_{-1}$, $3_{-2}$ ... which are formed to be of additive polarity.

The primary windings $3_{-1} - 3_{-4}$ and said another primary winding $3_{-6}$ are grounded at their respective one ends (lower ends in FIG. 10) and said primary windings $3_{-1} - 3_{-4}$ are connected at their respective other ends (upper ends in FIG. 10) to receive the respective AC input signals $1'$, $1'$, $1'$ and $1'$ so as to produce respective additive magnetic fluxes, while said another primary winding $3_{-6}$ is connected at its other end (upper end in FIG. 10) to a cancelling AC power source 16 which has a frequency and phase identical with those of the AC input signals $1'$, $1'$, $1'$ and $1'$ to produce magnetic flux for cancelling the total magnetic flux induced in the primary windings $3_{-1} - 3_{-4}$.

With the thus constructed circuit formation, it is apparent that there appear no outputs at secondary winding $3_{-5}$ for a normal condition, and accordingly it is also obvious that an amplifier 4 and alarm means connected to said secondary winding $3_{-5}$ are kept inoperative.

Thus, there are produced no outputs from the alarm means 5 due to the magnetic cancellation of the AC input signals $1'$, $1'$ ... and the cancelling power source 16 as long as the condition of the object to be supervised or monitored has been normal. If at least one of the AC input signals $1'$, $1'$ ... is, however, changed in its level or phase (for example one of said AC input signals becomes zero or inverted in its phase), the balance required for cancelling magnetic flux at the transformer no longer exists, and an induced voltage appears at the secondary winding $3_{-5}$ depending upon the difference between the amount of the magnetic flux caused by the AC input signals $1'$, $1'$ . . . and the amount of the magnetic flux caused by the cancelling power source 16. The thus obtained voltage is applied to the amplifier 4 and the alarm means 5 to indicate the changes in the input signals.

In this connection, it is to be noted that in case the AC input signals $1'$, $1'$ . . . are varied in frequencies, levels or phases, the magnetic cancellation cannot be effected completely at the multi-input transformer 3. This problem can be easily solved by preliminarily adjusting the signals $1'$, $1'$ . . . with respect to their frequencies, levels or phases.

Illustratively stated, since the AC input signals $1'$, $1'$ . . . may possibly be varied due to unevenness or inequality in levels or phases which is caused by differences in the impedance of the conductors for the signal generators such as various transducers or sensors, or differences in the mounting means thereof, a circuit 2 for adjusting the levels or phases is connected to the input terminals of the respective primary windings $3_{-1}$ – $3_{-4}$ of the transformer 3, or an adjusting circuit 17 is connected only to the input terminal of the primary winding $3_{-6}$, to eliminate said unevenness or inequality in levels or phases.

Figure 11:
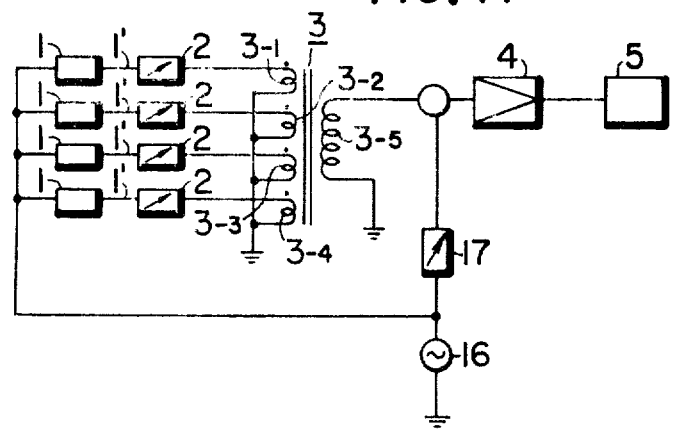

While in the device of FIG. 10 the cancelling AC power source 16 is connected to one primary winding $3_{-6}$ of the transformer 3, the circuit for the device may be modified as shown in FIG. 11. In the circuit of FIG. 11 are employed a multi-input transformer 3 which includes primary windings $3_{-1}$ – $3_{-4}$ corresponding to the AC input signals $1'$, $1'$ . . . , and a secondary winding $3_{-5}$, and a cancelling AC power source 16 which is adapted to be superposed on the induced voltage of the secondary winding $3_{-5}$ to effect cancellation of the AC input signals $1'$, $1'$ . . . like the circuit formation of the foregoing embodiment.

The devices of these embodiments are capable of accurately and positively detecting even an abnormality in only one of the signals $1'$, $1'$ . . . by a single circuit.

Said devices have further advantages in that abnormality is accurately detected irrespective of the number of the input signals changed or varied in characteristics (in abnormality) and that the number of the signals in abnormality is known by the difference in the output signal levels. Further, said devices are capable of being adapted to accommodate a possible increase or decrease in the number of the AC input signals by preliminarily providing any desired number of the primary windings $3_{-1}$, $3_{-2}$ . . . in the multi-input transformer 3 and then connecting lines for the AC input signals $1'$, $1'$ . . . to said primary windings $3_{-1}$, $3_{-2}$ respectively, thus providing advantages suitable for wide application of the centralized supervisory device conjointly with its ease of operation or handling.

These devices are further capable of absorbing possible unevenness or inequality in levels or phases of the input signals by additionally providing the signal adjusting circuit 2 to increase response accuracy, whereby connection of the AC signal generators 1, 1 . . . and wiring for introducing the input signals become simple and easy, effectively facilitating practical application of the device.

Figure 12:
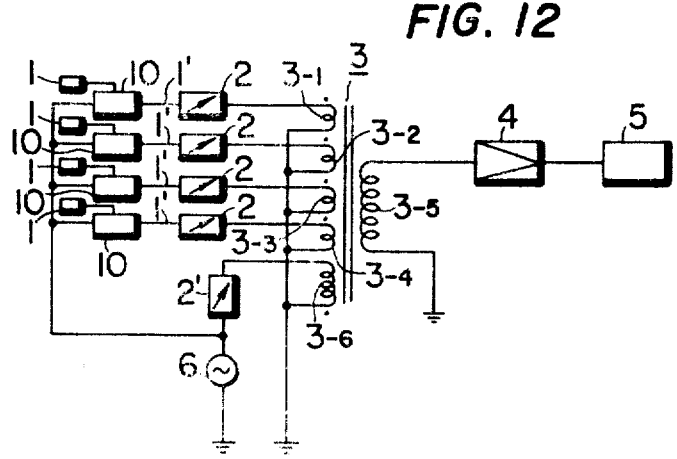
FIGS. 12 and 13 are circuit diagrams of devices for detecting abnormality in tires which have devices of FIGS. 10 and 11 mounted on vehicles, respectively.
Figure 13:
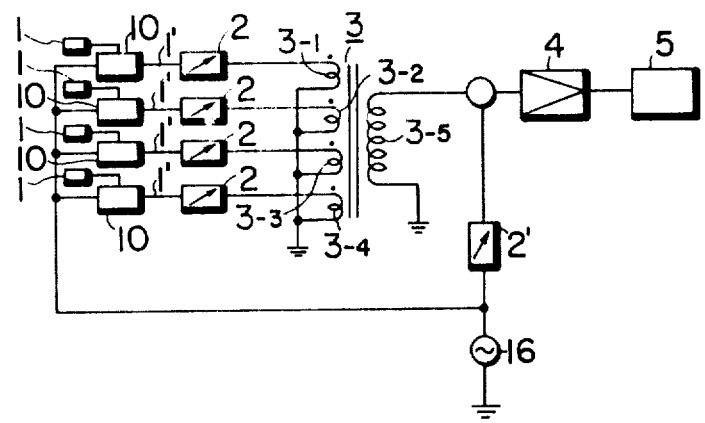

FIGS. 12 and 13 show devices which respectively have detecting devices as shown in FIGS. 10 and 11 applied for detecting possible abnormality in tires of a vehicle such as a motor car or air plane. In these devices, a transmitter unit is composed of an AC signal generator 1 and a sensor 10 which is mounted on each rotary tire system like the devices of FIGS. 5 through 8. Said transmitter unit is adapted to change the characteristics such as level, phase or frequency of AC input signals $1'$ produced from a generator 1 upon actuation of the sensor when some abnormality occurs in the tires. The AC signal generator 1 may be fixed to a car body and connected to the sensor 10 which is fixed to a rotary member such as a tire rim through a wire system using sliding mechanism provided in a wheel axle, or alternatively the AC signal generator 1 may be connected to the sensor 10 through a radio system by conveying the operation of the sensor 10 to the AC signal generator 1 through electromagnetic induction similarly to the devices as shown in FIGS. 5 through 8.

The formation of a propagation circuit for the signals from said AC signal generators 1 and the operation of said circuit are identical with those of the devices as shown in FIGS. 10 and 11.

In the thus constructed device, there appear no outputs at the alarm means 5 due to the magnetic cancellation of the AC input signals $1'$, $1'$. . . and the cancelling power source 16 as far as the objects to be supervised, or tires have been in a normal condition. If at least one of the AC input signals $1'$, $1'$ . . . is, however, changed in its level or phase (for example one of said AC input signals becomes zero or inverted in its phase), the balance for cancelling magnetic flux at the transformer 3 is broken and induced voltage is caused at the secondary winding $3_{-5}$ depending upon the difference between the amount of the magnetic flux caused by the AC input signals, $1'$, $1'$. . . and the amount of the magnetic flux caused by the cancelling power source 16. The thus obtained voltage is applied to the amplifier 4 and the alarm means 5 to indicate the changes in the input signals to a driver.

The AC signals $1'$, $1'$. . . which are uneven or inequal in their frequencies, levels or phases may be treated in a manner similar to the case of FIG. 10.

In the present embodiment, the cancelling AC power source 16 is illustratively shown in the form where it is connected to one of the primary windings $3_{-6}$.

A device as shown in FIG. 13 employs a multi-input transformer 3 which has primary windings $3_{-1}$ – $3_{-4}$ corresponding to AC input signals and a secondary winding $3_{-5}$, and a cancelling AC power source 16 which is adapted to be superposed on induced voltage of the secondary winding $3_{-5}$ to cancel the AC input signals $1'$, $1'$ . . . .

Now, referring to FIGS. 14 through 19, there are illustrated mechanisms of an AC input signal transmitting devices of such abnormality detecting apparatus for vehicle's tires as shown in FIGS. 5 to 6 and FIGS. 12 to 13. The AC input signal transmitting device is directed to a tire's inner air pressure detecting signal-generating device of such a type as utilizing an electromagnetic induction for transmitting and receiving a signal, and is so arranged that there is provided an induction compensation system capable of compensating a mutual induction between the magnetic transmitting and receiving coils. More specifically, there is provided a highly sensitive signal detecting device of practical utility wherein an input wave-form coming from a transmitter circuit is superposed onto a noise signal generated due to a mutual induction between the magnetic transmitting and receiving coils to effect compensation of the mutual compensation and further, if desired, either a phase adjustment or a gain adjustment between the noise signal and the input wave-form is effected to thereby extremely increase the ratio of signal to noise (S/N) of the device so that the signal receiving sensitivity is remarkably enhanced.

There have heretofore been proposed a wide variety of tire's air pressure detecting devices capable of automatically detecting a tire's inner air pressure of a motor car. In a representative example of the conventional devices, the motor car is provided, at its rotary tire system such as a wheel axle, with an electric winding. To the terminals of the electric winding are connected the output terminals of a pressure sensor which is adapted to be operative in response to air pressure of a tire. On the other hand, in a stationary system, a transmitting coil and a receiving coil are provided in proximity to the above-mentioned electric winding whereby a signal from the transmitting coil is transmitted to the receiving coil through the medium of the electric winding. This type of conventional device is comparatively excellent in response reliability and accuracy and is widely used. In such type of detecting device, there is employed such a principle that at the time when the pressure sensor, for example a pressure valve switch is brought into contact at its output contact, i.e., at the time when the circuit of the electric winding is closed, the signal coming from the magnetic transmitting coil is transmitted to the magnetic receiving coil through the electric winding by the action of electromagnetic induction. With such device, however, there is, in practice, observed additional transmission and receipt of signals between the magnetic transmitting coil and the magnetic receiving coil, not through the medium of the electric winding. Illustratively stated, such additional transmission of signals occurs by the other electromagnetic inductions which are not due to an ON-OFF operation of the contact of the pressure valve switch, for example, direct induction between magnetic coils or induction through the magnetic bodies such as rim, rim disc, brake drum, etc. The additional transmissions of signals become an obstacle to an increase in the sensitivity of an amplifier, i.e. increase of the ratio of signal to noise.

For eliminating such unfavorable phenomena, there can be mentioned various measures such as adjustment of position of a magnetic transmitting and receiving head, change or modification of designs of the rim and rim disc and the like so that the mutual induction may be compensated. In adopting such measures, however, there are various problems such as complexity of operation, difference in individual desired conditions, etc. Further, even with such measures, perfect compensation can not be expected, leading to less practical utility.

The instant device is extremely useful to obviate such drawbacks of the conventional detecting devices. In the instant AC input signal generating device, a circuit which effectively functions to superpose an input waveform coming from a transmitter circuit onto a noise signal of a receiver circuit to thereby effect compensation of a mutual induction is incorporated in an electric circuit of the device, and at least either a phase adjustment and or a gain adjustment between the input wave form and the noise signal generated due to the mutual induction is effected, whereby the mutual induction can be easily and accurately compensated without any need of complicated mechanical operation, for example by a simple operation of an adjusting screw.

The term "rotary tire system" is intended to mean all parts or portions of a wheel with a tire mounted thereon. The term "stationary system" is intended to mean all parts or portions of a vehicle's body which are in a stationary state in contrast with the rotary tire system.

Figure 14:
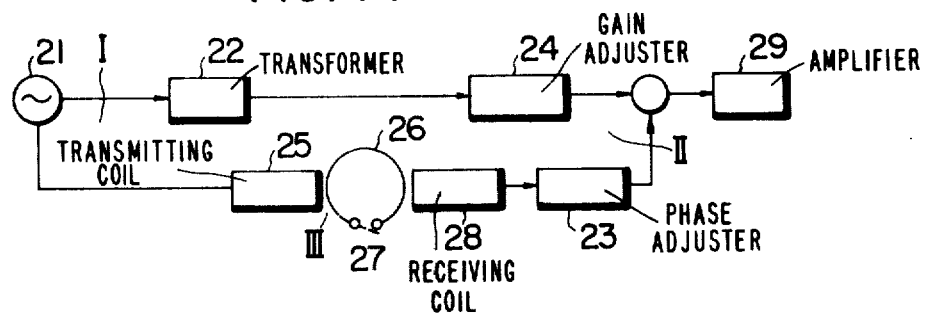
FIGS. 14 through 20 show various forms of AC input signal generating means employable in devices for detecting air pressure of tires of vehicles according to the present invention.
Figure 15:
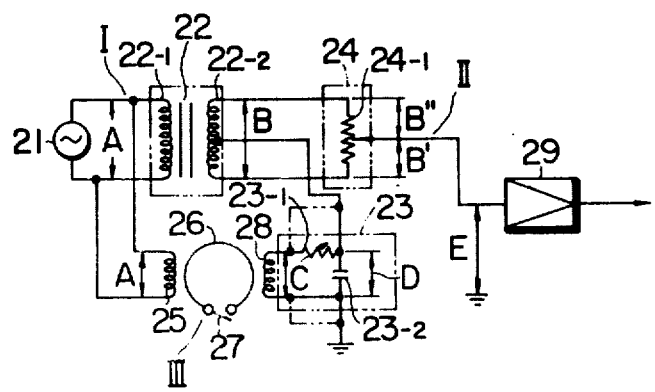

In FIGS. 14 to 15, numerals I, II and III designate a transmitter, a receiver and a junction winding, respectively. The transmitter I and the receiver II are attached to a stationary system, i.e., a body of a vehicle, for example a motor car while the junction winding III is attached to a rotary tire system.

In the transmitter I, numeral 21 designates a generator for generating an AC signal, numeral 22 designates a transformer for converting the generated AC signal to a signal having an appropriate voltage and numeral 25 designates a magnetic transmitting coil for transmitting, upon receipt of the signal coming from the generator 21, an electromagnetic wave.

In the receiver I, numeral 28 designates a magnetic receiving coil, numeral 23 designates a phase adjuster circuit composed of a variable resistor $23_{-1}$ and a condenser $23_{-2}$, numeral 24 designates a gain adjuster circuit including as an element a resistor with a variable intermediate tap $24_{-1}$, both terminals of which resistor 24 are connected to a secondary winding $22_{-2}$ of the transformer 22 and numeral 29 designates an amplifier circuit for amplifying the received signal and transmitting an output signal to a primary winding of a multi-input transformer (not shown) in the subsequent stage.

Figure 19:
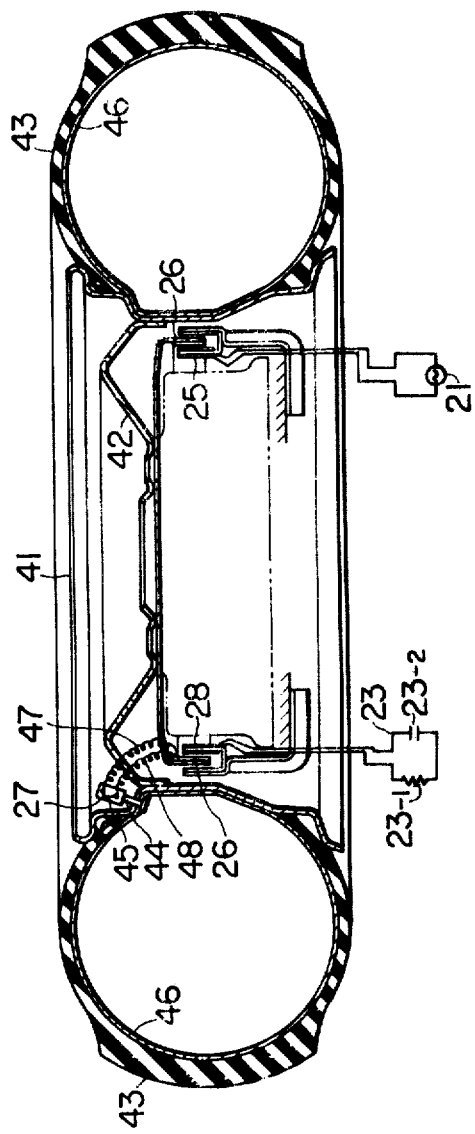

The junction winding III is composed of an electric winding 26 and a pressure switch 27 serving as a pressure sensor which is operative in response to air pressure of a tire. As shown in FIG. 19, the electric winding 26 may be made, for example, by winding an insulated fine copper line into a coil having a predetermined number of turns. The thus produced electric winding 26 is fixedly attached to a rim 41 of a tire 43 in coaxial relation therewith, in such a manner that the winding is insulated from the rotary tire system and has both its ends opened free. The electric winding 26 may alternatively be made by processing a copper bar into an annular one with both its ends opened free, thus providing a so-called 1-turn winding.

The thus arranged electric winding 26 is in coaxial relation with a wheel axle and therefore, when a disc 42 fixed to the wheel axle is rotated, the electric winding 26 is caused to smoothly rotate in a plane perpendicular to the wheel axle.

The pressure switch 27 is composed of a detector 44 for detecting an air pressure in, for example a tire 43 and a switch means 45 cooperating with the detector 45 to effect a make and break operation in response to change in the air pressure. The detector 44 pierces the rim 44 and is fixed thereto so that it may detect an inner pressure of a tube 46.

The switch means 45 of the pressure switch 27 has one terminal connected to one end of a lead wire 47 which is connected at the other end to one end of the electric wiring 26, and has the other terminal connected to one end of a lead wire 48 which is connected at the other end to the other end of the electric wiring 26.

The structure of the transmitting coil 25 is substantially the same as that of the receiving coil 28. Therefore, explanation of the structure will be made only in respect of the transmitting coil. The transmitting coil 25 wound around a U-shaped core is fixedly attached to a car body frame as a stationary system, in a portion proximate and opposite to the electric winding.

The circuit diagram of the thus arranged detecting device is illustrated in FIG. 15. The output signal from the generator is applied to the primary winding 22-$_1$ of the transformer 22 and the transmitting coil 25 as explained before. The receiving coil 28 for receiving a signal from the transmitting coil 25 through the electric winding 26 is connected to the phase adjuster circuit 23 composed of the variable resistor 23-$_1$ and the condenser 23-$_2$, connected to the variable resistor 23-$_1$ and the condenser 23-$_2$ in series and in parallel, respectively, and connected at its one end to the ground and at the other end to a neutral point in the secondary winding 22-$_2$ of the transformer 22.

To the resistor 24-$_1$ for the gain adjustment of which the variable intermediate tap is connected to an input terminal of the amplifier circuit, is applied the voltage between both ends of the secondary coil 22-$_2$.

Figure 16A:
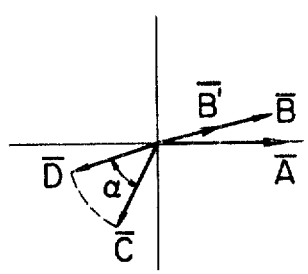
Figure 16B:
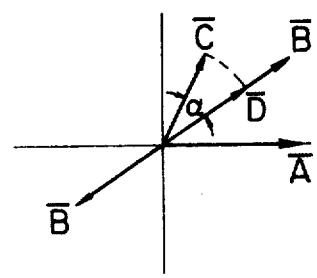

The operation of the thus constructed AC signal transmitting device will be explained. Let us assume that a voltage vector of an AC signal applied to the primary winding 22-$_1$ of the transformer 22 and the transmitting coil 25 is $\overline{A}$, a voltage vector of a secondary induced voltage exerted on the secondary winding 22-$_2$ is $\overline{B}$ and a voltage vector of the received signal exerted on the receiving coil 28 is $\overline{C}$. Further let us consider the case where the electric winding 26 is opened, that is, the value of air pressure is abnormal and therefore the propagation of an electromagnetic wave to the receiving coil 28 from the transmitting coil 25 is effected only due to a mutual induction. Then, it follows that the relation between $\overline{A}$, $\overline{B}$ and $\overline{C}$ is as shown in FIG. 16 (a).

When the variable resistor 23-$_1$ of the phase adjuster circuit 23 is adjusted so that the vector $\overline{C}$ of the noise signal exerted on the receiving coil 28 is inverse in phase, relative to the vector $\overline{B}$ of the induced voltage exerted on the secondary winding 22-$_2$, there is obtained from the output terminals of the circuit 23 a vector $\overline{D}$ having a phase inverse to that of the vector $\overline{B}$. Whereupon, if the adjustment of the tap in the gain adjuster circuit 24 is done to effect an appropriate displacement from the neutral point, it is extremely easy to set a vector $\overline{B}'$ (See FIG. 15) so that a voltage vector $\overline{E}$ (See FIG. 15) of a signal at the output terminals of the gain adjustment circuit 24 becomes such that $\overline{E} = \overline{B}' + \overline{D} = 0$.

Figure 5:
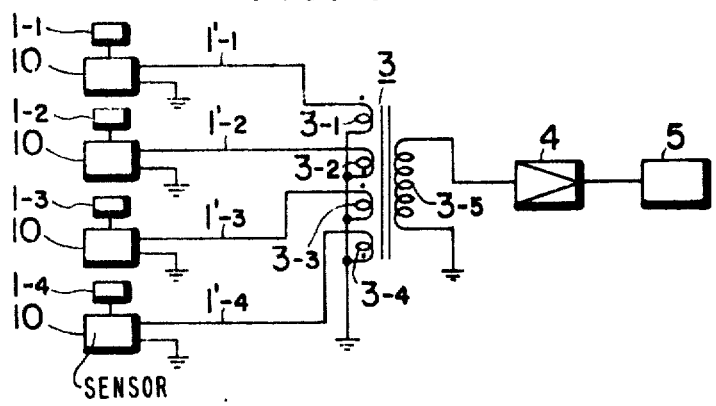
FIGS. 5 through 9 are circuit diagrams of devices for detecting abnormality in tires which have devices of FIGS. 2 through 4 mounted on vehicles.
Figure 6:
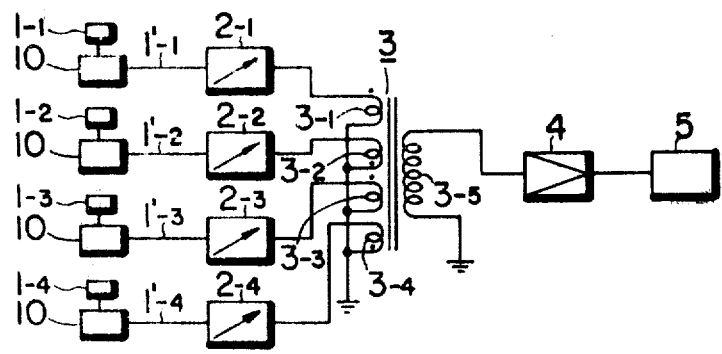
Figure 7:
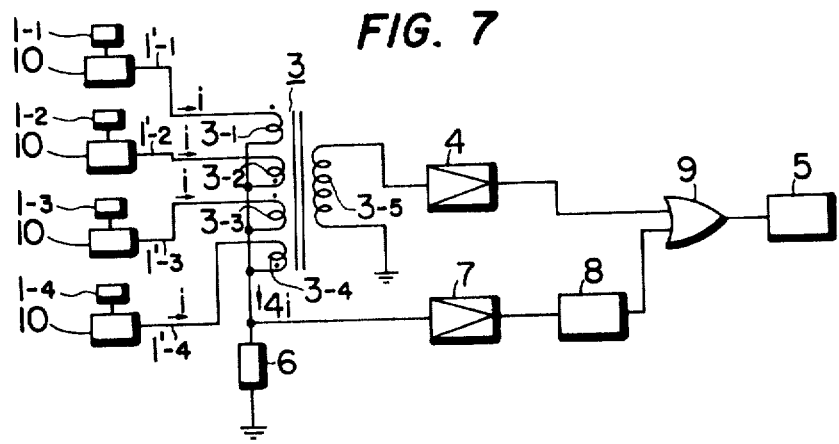

In case the phase difference of the vector $\overline{C}$ in relation to the vector $\overline{B}$ is less than $\pi/2$, it is natural that there can be a case where such a situation as represented by the formula $\overline{E} = \overline{B}'' + \overline{D} = 0$ is established by utilizing a vector $\overline{B}''$ of an output voltage of the gain adjuster circuit in FIG. 5. In such case also, the present device is applicable without any need of change or modification.

When the noise signal induced by a mutual induction has a phase which is approximately the same as or inverse to the voltage induced on the secondary winding, the same effect is attained even if the phase adjuster circuit 23 is omitted and the portion shown in FIG. 15 at a two-point chain line is made short. Further, when the gain of the noise signal is approximately the same as that of the input signal to be superposed, the gain adjuster circuit 24 may be omitted. In this connection, it is to be noted that when the above-mentioned conditions appear simultaneously, both the circuits 23 and 24 may be omitted.

Figure 17:
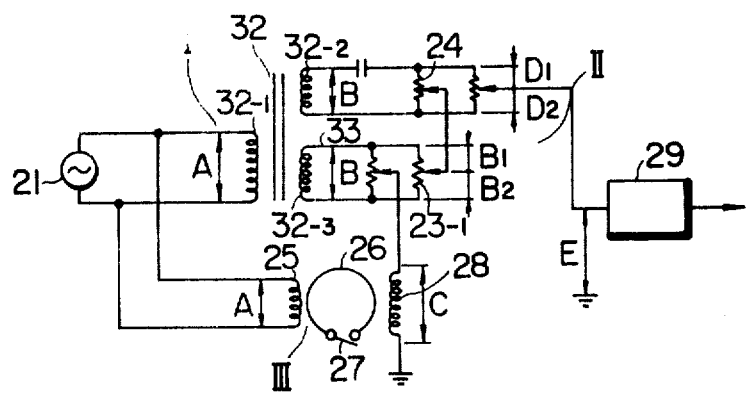

Various changes and/or modifications may be made. For example, as shown in FIG. 17 it is possible to employ a hybrid-coil and such a circuit as is capable of compensating a mutual induction by effecting a phase adjustment and a gain adjustment in association with a secondary winding 32-$_2$ and a tertiary winding 32-$_3$. Such a modified device is of course included in the scope of this invention.

Figure 18:
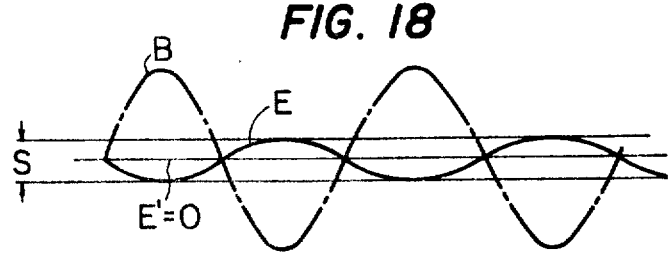
Figure 20:
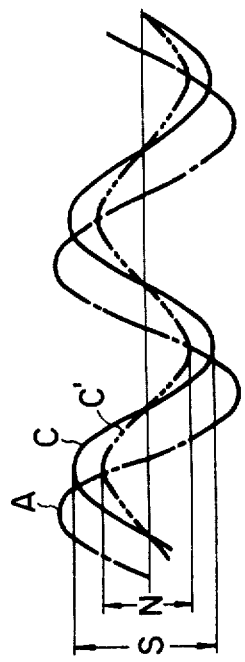

Analysis of the noise signal compensation effect of the instant device will be made from a view point of a wave-form. In FIGS. 18 and 20, $\overline{A}$, $\overline{B}$, $\overline{C}$ and $\overline{E}$ are voltage wave-forms corresponding to said vectors A, B, C and E, respectively (C designates a sum of mutual induction and electromagnetic induction). Let us assume that C' and E' are mutual induction components of C and E, respectively. In the case of a conventional apparatus not having the instant device, when the electric winding 26 is opened, C', namely an external disturbance N, is propagated to the amplifier circuit 29 whereby a large S/N can not be obtained under the closed condition of the electric winding 26, so that an increase in sensitivity of the amplifier circuit 26 can not be attained. By contrast, with the instant compensation device by which C has a phase inverse to that of B and the output wave-form is superposed to cancel C', it follows that the external disturbance $N = E' = 0$. As a result, the ratio S/N is increased to be infinitely great. Thus, it is clearly proved that employment of the instant device is extremely effective to increase the sensitivity of the amplifier circuit 29.

As discussed above, in an AC input signal detecting device a change in an air pressure of tire is transmitted from a transmitter to a receiver in the form of a change in an electric signal by the action of electro-magnetic induction. In such detecting device a noise signal exerted due to a mutual induction is cancelled by superposing thereonto an input wave-form from a transmitter circuit; and further when there are a phase difference and/or a gain difference between the input wave-form and the noise signal, at least one of a phase adjustment and a gain adjustment is effected, thereby to compensate a signal generated due to mutual induction other than a normal signal. With the device so constructed, a high ratio of signal to noise (S/N) can be obtained, and the detecting device can have high reliability as a whole and can be produced at a low cost.

Further, due to such circuit construction capable of compensating a noise signal, there is no need of considering a special arrangement of a transmitting coil and a receiving coil, namely, both coils can be not only easily installed but also arranged in proximity to each other, which greatly contributes to development of sensitivity of the detecting device.

The present device having such remarkable effects as explained above is an indispensable one in promoting reliability and utility of a device for detecting an air pressure in tire.

Further, if said device is used in combination with the aforementioned multiple input signal detecting device, it is very useful as a detecting device capable of centrally supervising an abnormality of a tire at a driver's seat.

What is claimed is:

1. A device for detecting multiple input signals, which comprises a signal detecting circuit including a plurality of signal carrier lines for carrying a plurality of AC input signals changeable in electric characteristics such as levels, phases or frequencies upon occurrence of abnormality and a multi-input transformer having a plurality of primary windings connected to respective signal carrier lines and at least one secondary winding including an output secondary all the windings being wound around an iron core having a common magnetic circuit, and an output circuit for treating an output from said output secondary winding of the multi-input transformer; said primary windings in the signal detecting circuit being wound to magnetically cancel magnetic flux of said AC input signals when all of the signals are kept normal and connected between said signal carrier lines and said output circuits to produce an output at said output secondary winding upon breakage of the balance for magnetic cancellation when at least one of the AC input signals is in abnormality.

2. A device according to claim 1, wherein said AC input signals are of an even number, half of either of said signal carrier lines said primary windings are inverted in polarity, and said magnetic cancellation of the magnetic flux caused by said AC input signals is effected at the primary windings of the transformer.

3. A device according to claim 2, wherein said primary windings are grounded at their respective ends at a reference potential through an impedance connected in common thereto, and said output circuit includes an OR circuit for making logical sum of a signal obtained through detection of an AC signal appearing across the ends of said impedance and a signal obtained through treatment of the output from the output secondary winding of the multi-input transformer.

4. A device according to claim 2, wherein at least one of the signal carrier lines has an adjusting circuit for adjusting at least one of the levels and the phases of said AC input signals carried by said lines.

5. A device according to claim 2, wherein said signal carrier lines, said signal detecting circuits and said output circuit are provided on a body of a vehicle and said signal carrier lines are connected to output terminals of transmitter units each composed of a sensor for detecting abnormality in a tire attached to a respective wheel of the vehicle and an AC signal generator provided on the body and adapted to transmit AC signals upon direct receipt thereof through an electric conductor or indirect receipt thereof by electromagnetic induction from the operation of the sensor.

6. A device according to claim 1, wherein said signal carrier lines are connected to said signal detecting circuit to apply AC input signals carried by the respective lines to the respective primary windings with a polarity to add their total magnetic flux at the primary windings of said multi-input transformer, and to either the primary windings or the secondary winding is connected an AC power source for cancelling the total magnetic flux of the AC input signals.

7. A device according to claim 6, wherein at least one of the signal carrier lines is provided with an adjusting circuit for adjusting at least one of the levels and the phases of the AC input signals carried by said lines.

8. A device according to claim 6, wherein said signal detecting circuit and said output circuit are provided on a body of a vehicle, and said signal carrier lines are connected to output terminals of transmitter units each composed of a sensor for detecting abnormality in a tire attached to a respective wheel of the vehicle or a spare tire, and an AC signal generator provided on the body and adapted to transmit AC signals upon direct receipt through an electric conductor or indirect receipt by electromagnetic induction from the operation of the sensor.

9. A device according to claim 1, wherein said signal carrier lines are each connected to output terminals of a respective AC signal transmitting unit provided in each of a plurality of rotary tire systems, and comprising an electric winding connected at both its ends to a pressure sensor which is attached to each of said rotary tire systems in a coaxial relation and adapted to be operative in response to an air pressure of the tire, a transmitting coil and a receiving coil both attached to the body of the vehicle in proximity to said electric winding, and a transmitter circuit and a receiver circuit both attached to the body of the vehicle in association with said transmitting coil and said receiving coil, respectively, whereby: a signal from said transmitting coil is transmitted as a change of level to said receiving coil through said electric winding, an input wave-form from said transmitter circuit is superposed onto a noise signal of said receiving coil generated due to a mutual induction other than that caused by a normal signal to be transmitted, and at least one adjustment of a phase adjustment for adjusting phases of the input wave-form and the noise signal to opposite phases and a gain adjustment for making the value of the superposed input and the value of the noise signal coincident with each other is effected; thereby to compensate the mutual induction other than that caused by the normal signal.

* * * * *